(12) United States Patent  (10) Patent No.: US 8,712,113 B2
Sarda et al.  (45) Date of Patent: Apr. 29, 2014

(54) METHOD TO TRACE VIDEO CONTENT PROCESSED BY A DECODER

(75) Inventors: Pierre Sarda, Paris (FR); Minh Son Tran, Paris (FR); Corinne LeBuhan, Les Paccots (CH)

(73) Assignee: Nagravision S.A. (CH)

( * ) Notice: Subject to any disclaimer, the term of this patent is extended or adjusted under 35 U.S.C. 154(b) by 316 days.

(21) Appl. No.: 13/305,908

(22) Filed: Nov. 29, 2011

(65) Prior Publication Data

US 2012/0134530 A1    May 31, 2012

Related U.S. Application Data

(60) Provisional application No. 61/417,523, filed on Nov. 29, 2010.

(30) Foreign Application Priority Data

Sep. 2, 2011    (EP) .................................. 11179945

(51) Int. Cl.
*G06K 9/00* (2006.01)
*G06K 9/36* (2006.01)
(52) U.S. Cl.
USPC .......................................... 382/124; 382/232

(58) Field of Classification Search
USPC ................................ 382/124–128, 232–253
See application file for complete search history.

(56) References Cited

U.S. PATENT DOCUMENTS

| | | | |
|---|---|---|---|
| 6,285,774 B1 | 9/2001 | Schumann et al. | |
| 6,381,367 B1 * | 4/2002 | Ryan | 382/232 |
| 6,687,384 B1 | 2/2004 | Isnardi | |
| 7,003,131 B2 | 2/2006 | Watson et al. | |
| 7,058,809 B2 | 6/2006 | White et al. | |
| 7,903,751 B2 * | 3/2011 | Fiesel et al. | 375/260 |
| 2007/0242862 A1 * | 10/2007 | Watson et al. | 382/124 |
| 2008/0013614 A1 * | 1/2008 | Fiesel et al. | 375/224 |
| 2010/0040228 A1 | 2/2010 | Lecomte et al. | |
| 2010/0128871 A1 | 5/2010 | Folea et al. | |
| 2011/0022206 A1 * | 1/2011 | Scharrer et al. | 700/94 |
| 2011/0112669 A1 * | 5/2011 | Scharrer et al. | 700/94 |

FOREIGN PATENT DOCUMENTS

| | | |
|---|---|---|
| EP | 2 204 979 A1 | 7/2010 |
| WO | 2007/067168 A1 | 6/2007 |
| WO | 2008/081113 A2 | 7/2008 |
| WO | 2010/003152 A1 | 1/2010 |

* cited by examiner

*Primary Examiner* — Alex Liew
(74) *Attorney, Agent, or Firm* — DLA Piper LLP (US)

(57) ABSTRACT

A method traces the origin of a (illegally) distributed video material. It fingerprints a data object A having a nominal stream format F to provide a fingerprinted data object B including a pre-fingerprinting forensic luring process.

15 Claims, 3 Drawing Sheets

0 : P1/RVa1/RVb1 -> RVa1
1 : P2/RVa2/RVb2 -> RVb2
1 : P3/RVa3/RVb3 -> RVb3
0 : Pn/RVan/RVbn -> RVan

METHOD TO TRACE VIDEO CONTENT PROCESSED BY A DECODER

CROSS REFERENCE TO RELATED APPLICATIONS

This application claims priority under 35 U.S.C. Section. 119 to U.S. Provisional Application 61/417,523, entitled "Method to trace video content processed by a decoder" filed Nov. 29, 2010 and EP provisional application EP11179945.8, the content of which is hereby incorporated by reference herein.

FIELD OF THE INVENTION

The present application concerns the field of digital TV, particularly a method to trace the origin of a (illegally) distributed video material.

BACKGROUND OF THE INVENTION

Digital content providers seek to restrict usage of their audio visual contents by implementing conditional access. One such scenario is the security aspects of digital video broadcasting via satellite (DVB-S). There has been a history of attacks on this technology to circumvent any security measures and some techniques have been countered by the deployment of customized receivers. The crucial key of the security gap is that when an open receiver (even the proprietary one) comes into the possession of the user, it cannot be considered trusted. The user domain is an untrusted one and could be subject to standalone or colluding user attacks. Any software solution at the user domain must be therefore subjected to the so-called white box cryptography, a relatively recent research domain focusing on the protecting mechanism of a secret even if it is deployed with untrustworthy or easily exposed software execution.

Alternative solution is based on anti-tampered hardware. The introduction of a physical hardware component—like a smart cards—with a built-in processor aims to provide a trust in an unsecured environment of a receiver. It is believed that the answer lies in the smart card: this is the only trusted entity at the client end.

It is worth noting that the presence of a smart card does not resolve all threats to security. Thanks to the flexibility, well modularized structure of the open receivers, fraudulent user can still compromise the system with such "unbreakable" hardware component like smart cards. By spying the communication between the descrambler and a given smart card, a hacker can extract the necessary key for the descrambling process. The key is then distributed in mass to other illegal receiver, allowing clients (without subscription to the authorized content provider) to access the protected programs.

Admitting that conditional access never provides an absolute security, digital content providers try to deploy watermarking techniques in an audio visual content to insert automatically a unique identifier dedicated to each demanding user whenever he/she requests that content. Such identifier can be probably retrieved from an illegally distributed content. The malicious user can then be identified.

Several problems must be solved to enable the incorporation of the watermarking into the broadcasting chain. Among the others, they are the followings:

Find a way to insert unique information—an Identifier (ID)—about the targeted (authorized) client/user inside the delivered audio-visual content itself;

The impact of inserting the ID must be minimum. That is the marked content has an audiovisual degradation tolerance, which can be parameterized/adjusted to fit the specific requirements of a given application;

The ID should be inserted directly in the compressed content;

The ID is rather inserted at the client's side, to identify the device that has decrypted the content;

The insertion of ID into compressed content should not lead to an avalanche effect in the content due to drift effect. For the efficiently compressed content with arithmetic coder like H.264 CABAC, the constrained compensation is crucial to reduce the additional time of treatment.

The insertion of ID does not perturb the original bitrate of the content stream.

The potential extra bandwidth for supplementary data as well as its treatment is relatively low and easily handled.

The ID can be inserted in the lowest layer of packetization for transmission to reduce the buffering and complex parsing facilities The ID must be robust enough to survive from diverse signal processing operations, possibly performed by hackers or by the nature of the transmission channel.

One prior art method for watermarking compressed content is to insert watermark signals in the structure and syntax elements. U.S. Pat. No. 6,687,384 is an example for embedding data in syntax elements in a coded bit stream such as MPEG-1 and MPEG-2. Such watermarks do not, however, survive after format change or digital-analog conversion.

Another prior art, U.S. Pat. No. 7,058,809 introduces in a preprocessing phase at least 2 watermarked versions of the same content. The variant contents are then encrypted and partially combined in a unique manner for each targeted user. Pre-watermarking content twice seems to be a cumbersome process.

Yet in other prior arts, some special segments of compressed data are identified and modified directly. These segments are special because they can be replaced with at least an alternative one without severe impact to the final content. This bi-state of each segment can be exploited to carry one-bit of hidden ID. EP 2 204 979, U.S. Pat. Nos. 6,285,774, 7,003,131, WO 2007/067168 and WO 2010/003152 propose several ways to identify such carrier segment of data in the compressed domain. The common key-technique of these arts is a pure watermarking technique, which tends to minimize the impact on the quality of the content. The marked content are then protected separately with a conventional encryption technique In the prior application deposited also by the author of the present application, WO2008081113, a combined technique for marking and encrypting was taught to improve the security thanks to the coincidence of these 2 operations. The drawback of this technique is the requirement of 2 (virtual) streams, which produces the additional complexity for the synchronization and existing multiplexing.

SUMMARY OF THE INVENTION

The present invention proposes a method to resolve the disadvantages mentioned above.

This is achieved thanks to a method for fingerprinting a data object A having a nominal stream format F, to provide a fingerprinted data object B, comprising the pre-fingerprinting and forensic luring process, wherein the said pre-fingerprinting process comprising the steps of:

Determining a first set of elements of said original data object (A) having each an original value and a position, Replacing each original value by an alternate value to create a modified data object (C) that remains syntactically correct according to the said stream format F but semantically different according to the perceptive information carried by the said original data object (A), regardless which alternate value (AV) was replaced, Extending the said modified data object (C) with at least one supplementary object (Ss) to provide a fingerprinting-ready data object (D) having the same nominal stream format F, comprising, for each element, its position and at least a first replacement value and a second replacement value;

the said forensic luring process comprising the steps of:

Extracting the supplementary object from the fingerprinting-ready data object (D), Obtaining an identifier to be associated with the fingerprinted data object (B), Modifying the alternate values at positions in the elements, and for each element, selecting one of the replacement values based on all or part of the identifier to create the fingerprinted data object (B).

The crucial key-technique is the coincidence of the two operations: malicious users hardly decrypt content without being signed with his identification. Therefore it is not easy to have a clear, decrypted content to distribute illegally without proof of guilt.

In a preferred embodiment, the technique includes two separate processes, namely pre-fingerprinting and forensic luring. The former modifies a content to be protected by changing elements with values entailing a major perceptive alteration. It also prepares the necessary information for fingerprinting operation which is performed in the latter process: forensic luring. Note that luring and fingerprinting happen at the same time in the phase forensic luring as a main aspect of the invention. Hereafter the term 'fingerprinted luring' is used to emphasize this coincidence.

In a preferred embodiment, the pre-fingerprinting process comprising the steps of Replacing the original values OV of a plurality of elements E of a data object A with at least one alternate value AV to create a modified data object C that remains syntactically correct according to the said stream format F but semantically different according to the perceptive information carried by the said data object A, regardless which alternate value AV was deployed (in case of several AVs), Extending the said modified data object C with a plurality of supplementary objects Ss to provide a fingerprinting-ready data object D having the same nominal stream format F. Such supplementary objects Ss are formed on function of the modified elements E as well as their alternate values AVs. For each element, at least two replacement values RVa, RVb are determined based on the original value OV.

In a preferred embodiment, upon receiving the fingerprinted data object D, the forensic luring process starts with the steps of From the fingerprinting-ready data object D, identify the said modified elements E as well as the said alternative values AVs with the aid of the said supplementary objects Ss.

Obtaining an identifier ID, which is mapped to sequences of values. The value indicates uniquely one value among the said replacement values RVs for the element E associated with the position.

Re-modifying each said modified element E in the said fingerprinting-ready data object D to create the fingerprinted data object B; the modified elements Es of the said supplementary objects Ss are set in accordance with the identifier, said identifier determining if the first or the second replacement value is used to re-modify the element E.

The forensic luring process can be extended to another set of element E' (second set) that will only play a role in the luring process. To ensure that the fingerprinted data object B is not accessible without passing through the identification step explained above, a second set of elements are modified so that the fingerprinted data object B is not accessible without passing through the de-luring process.

For this second set of element, the supplemental object Ss further comprises for each element of the second set, the position P' and the original value OV'.

In an embodiment of the invention, the pre-fingerprinting and forensic luring processes are combined into one process on the same device. In another embodiment, they are performed in separated devices. The fingerprinting-ready data objects D are the interface exchanged between the two devices over the traditional broadcasting via terrestrial, cable or satellite channel.

In a preferred embodiment of the invention, the alternate value AV replacing the original one OV in the modified data object C is chosen among the candidates so that the maximal perceptive difference (degradation) according to the original data object A is produced.

In a preferred embodiment of the invention, the replacement value RV associated to the value of the identifier ID is chosen among the candidates so that it produces the minimum perceptive difference (degradation) in comparison with the replacement of the original value OV.

In a preferred embodiment of the invention, one of the replacement values can be the original value OV. In this case, the supplementary object Ss comprises one replacement value chosen to have little impact on the perception of the content as well as the original value.

In an embodiment of the invention, the marking subset MS consists of all modified element Es in the fingerprinting-ready data object D.

In an embodiment of the invention, the data object A, the fingerprinting-ready data object D and the fingerprinted data object B are in the format of the MPEG-2 transport stream format.

In an embodiment of the invention, the identifier is calculated from a unique internal parameter of the device where the forensic luring process is performed.

In a preferred embodiment of the invention, the calculating operation incorporates an anti-collusion encoding scheme to reinforce the affect/presence of the fingerprinting identifier in the fingerprinted data object B.

Terminologies and Abbreviations

Throughout the description of the present invention, we often use several terms. To avoid any ambiguity, each term is associated uniquely with a symbol. The terms and their associated symbol (in parentheses) are summarized in the following:

Original data object/original content (A): The input data to be protected with the present invention Lured data object/Lured content (C): The intermediate data (audiovisual stream) which is distorted after several modifications performed in the Pre-fingerprinting process Fingerprinting-ready data object/Fingerprinting-ready content (D): Another intermediate data (audiovisual stream) produced by the Pre-fingerprinting. In fact, it is the above stream C extended with additional data structure.

Fingerprinted data object/Fingerprinted content (B): the final output data protected with a unique fingerprinting.

Element (E): A syntax element or a segment of bits in the original content A which is a target of the invention. Its value can be replaced (the resulting content becomes lured content C) and then recovered with its original value or slightly different value to carry one bit-information of the fingerprinting identifier. To avoid the confusion with any classical "element", the element with the aforementioned meaning is described always with the symbol E.

Original Value (OV): The original value of an element E occurring in the original content A.

Alternate Value (AV): A value (rather than the original value OV) to be recovered to an element E in the final fingerprinted content B.

Luring Value (LV): A special value of the alternate values AV. It produces possibly maximum distortion to the original content A while being deployed instead of the original value OV.

Marking Value (MV): A special value of the alternate values AV. It produces possibly minimum distortion to the original content A while being deployed instead of the original value OV.

Marking Subset (MS): A subset of all detected elements E. The member of this subset will be recovered with one of the replacement values RV (possibly with OV) on function of the fingerprinting identifier.

Transport Stream (TS): A format of audio visual transmission specified in the standard MPEG-2 part 1.

Control Session Transport Packet (CSTP): A special TS packet introduced into the Fingerprinting-ready content D. It contains only the adaptation field, which in turn consists of the necessary data to recover the element E in the content D.

Elementary Transport Packet (ETP): A normal packet in the original content A, which contains several element E to be modified/recovered.

Properties of Element (PoE): All necessary information enabling the recover of an element E. They include the means to localize the element E in the original content A (even in C and D), the size, the original values OVs and their alternative value AVs. The PoE can include the derived values of the above parameters.

BRIEF DESCRIPTION OF THE DRAWINGS

The above aspect of the present invention will become more apparent by describing in detail the exemplary embodiments thereof with reference to the attached drawing figures.

DETAILED DESCRIPTION

Reference will now be made in detail to the preferred embodiments of the invention, examples of which are illustrated in the accompanying drawings. While the invention will describe in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
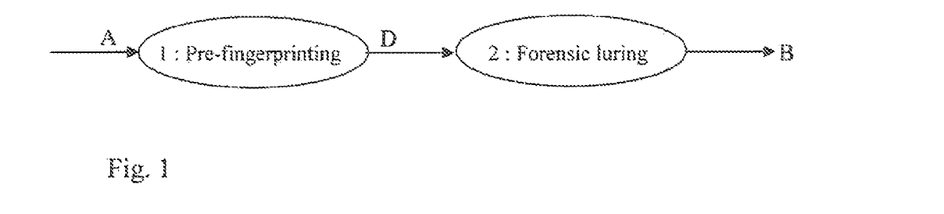
FIG. 1 shows the main components for creating a fingerprinted content according to one embodiment of the present invention.

FIG. 1 outlines the two main functionalities as well as the exchanged data according to one embodiment of the present invention.

1. Pre-Fingerprinting

According to a preferred embodiment of the present invention, the process 1: Pre-fingerprinting in FIG. 1 is performed in a server, i.e. a transmission device, located at the providers or distributors side or at one of their head-ends within the distributing network. In another embodiment, the process 1 is performed at client side, having a secondary network of multimedia distribution. In the latter case, the process 1 is found in the center-device to prepare the content before transmission to other devices located separately in different rooms of the house.

An original audiovisual content A, handled by the process 1: Pre-fingerprinting becomes a lured content D. The latter has several following properties:

Having the same format as the one of the content A. The identical format is hereafter referred to as F. Several examples of the format F are: MPEG-4 file format; MPEG-2 TS, PS format, ASF, WebM . . . .

When being viewed by a conventional player of the format F, the content D is parsed completely. However, according to a preferred embodiment of the current invention, the decoded audiovisual information is severely distorted from the point of view of human-being. In another embodiment, the degree of degradation is imperceptible.

Figure 2:
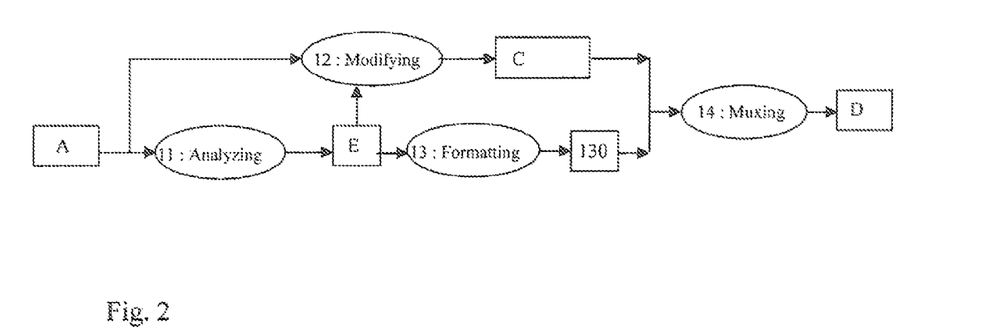
FIG. 2 shows a block diagram of the pre-fingerprinting process according to one embodiment of the present invention.

FIG. 2 describes in detail the operations of the process 1 over a content A according to one embodiment of the invention. At first, the content A is partially parsed by the analyzer 11 to detect plurality of the Elements Es to be modified. In a preferred embodiment of the invention, an element E is a syntax element of the format F. Yet in another embodiment of the invention, an element E corresponds to a binary bit-segment of the format F, which may contain entirely (or partially) several syntax elements including the stuffing bit and reserved bits.

An element E is considered as a valid candidate if and only if it is a kind of multi-value. Besides the Original Value OV, the candidate E will have at least one other value called Alternate Value AV.

In a preferred embodiment of the invention, all AVs reserve the same size in the stream of the format F, which causes no shifting offset at all while alternating among the values AVs and OVs. In other embodiment of the invention, the size of the values AVs can be different from each other as well as from the OVs.

In a preferred embodiment of the invention, among the plurality of AVs, there are two special candidates as the following:
1. Luring Value LV: In content C, it is a value AV producing the maximum perceptive distortion while being deployed instead of OV.
2. Marking Value MV: Inversely, it is a value AV producing the minimum perceptive distortion while being deployed instead of OV in the content C.

In one embodiment of the invention, the MV and LV are identical.

We now provide several such elements Es found in the format H264-CABAC (mostly used in broadcast environment). In a referred embodiment of the invention, the modifications are applied to some special syntax elements in the slice header, which is encoded with variable length codes. Therefore, when its OV is replaced with either LV or MV, the intact syntax elements in the successive slice data (encoded with an arithmetic encoder) can be correctly reused. These special syntax elements are: the NALType, the Quantification Parameter, the First MacroBlock Address and the Deblocking Filter.

In other embodiment of the invention, the element E can be the syntax element encoded in the CABAC bypass mode. In this special mode of the CABAC coder, the internal states (the Range and the Probability) of the arithmetic coder remain constant. Hence, there are more chances to restore the states of the arithmetic coder after an OV is replaced with an AV. That is the modification can be restrained to a limit number of bits in the stream F assigned to this kind of syntax element. They are the sign of coefficient, the suffix of a coefficient and the suffix of a motion vector differential. Yet in other embodiment of the invention, several bits at the end of a slice data (corresponding to several syntax elements of type DCT coefficient) can be together considered as an element E. Doing so, propagation of bit-modification is limited up to the end of the slice in question.

Possessing plurality of the elements Es, the unit 12 in FIG. 2 modifies the original content A accordingly. The following procedure will be performed iteratively:
1. Seek to the next element E in the stream of the format F,
2. Replace original value OV thereof with the associated Alternate Value AV.

When all elements Es are treated, the original content A becomes a lured content C. The term "lured" is named after the nature of the LV: causing the maximum distortion when being deployed in the content C.

The selected elements Es are also fed to the unit 13 in FIG. 2 to be formatted so that the resulting output 130 corresponds to the supplementary object Ss and is ready multiplexed into the lured data C. In a preferred embodiment of the invention, the supplementary object Ss comprises means for locating the elements Es in the stream F, the size of each element E as well as replacements values RV (which could be determined based on the original value OV), are treated and encapsulated in the data 130. An example of a means for locating an element E is a relative (or absolute) offset from a predefined marker up to the first bit of that element E. In the case of MPEG-2 TS format, the said marker can be the start byte of the containing TS packet or the first byte of its payload.

In one embodiment of the invention, the unit 13 compresses the Properties Of the Elements (PoE)—including their positions, their sizes, their RVs and/or any derived values from these quantities—before any other treatment. It is obvious to one of ordinary skill in the art that the compression technique here may refer to any technique to reduce the quantitative amount of data, which may or may not lead to a reduction in data quality. Such compressing techniques not exclusively include LVZIP, Delta coder and the likes.

Taking the format MPEG-2 TS as a preferred embodiment of the invention, the compressed PoEs are formatted into a structure of private data, occurring in the adaptation field of a TS packet. They are assigned to the data 130 in FIG. 2.

Upon receiving lured content C and the data 130, the muxer 14 in FIG. 2 ensures the syntactical correctness of the so-called fingerprinting-ready content D, the output data stream of the same format F.

Figure 4:
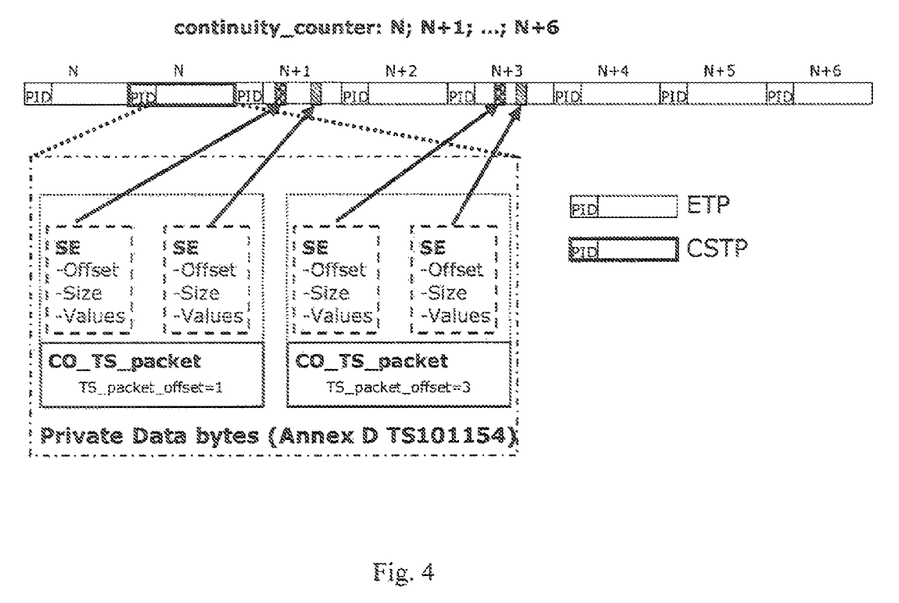
FIG. 4 illustrates the transport stream format of the fingerprinting-ready data D according to one embodiment of the present invention. This stream is delivered to the forensic luring from the pre-fingerprinting process.

FIG. 4 illustrates the stream MPEG-2 TS of such fingerprinting-ready content D according to a preferred embodiment of the invention. There are 8 successive TS packets of the same Packet Identification (PID). Among them, there are 7 packets of type Elementary Transport Packet ETP, which already exist in the original stream A. These packets contain elementary data (audio or video) for the given content. The order of these ETPs is represented with the subsequent integer value of the continuity_counter, a standard syntax element of a TS packet. Supposing that two elements Es can be found in the ETPs with continuity_counter equal to N+1 and N+2. Their PoEs (including Offset, Size and Values OV as well as AVs in FIG. 4) for each ETP are collected into a structure called CO_TS_packet, which is in turn grouped into a special TS packet called Control Session Transport Packet (CSTP).

In one embodiment of the invention, the packets CSTP altogether are considered as the supplementary data Ss, which are merged/multiplexed with the lured content C to provide the fingerprinting-ready content D.

Thanks to the parameter TS_packet_offset, each structure CO_TS_packet in CSTP is linked to an ETP, which contains the associated elements Es. In fact, the parameter TS_packet_offset expresses the relative distance from the CSTP to the linked ETP, measured in the value of continuity_counter. For instance, the right CO_TS_packet in FIG. 4 having TS_packet_offset equal to 3 indicates that its PoEs belong to the elements Es in the ETP, whose continuity_counter takes the value N+3. N is the continuity_counter value of the CSTP itself In this preferred embodiment of the invention, the CSTP does not contain any data in its payload. Its section adaptation_field is extended to the last data byte in that TS packet. The plurality of the structures CO_TS_packet are inserted as the private data byte in the section adaptation_field. According to the standard MPEG-2, such TS packet (having only adaptation field), must be signed with the field adaptation_field_control equal to 2.

In a preferred embodiment of the invention, the CO_TS_packet is entirely encrypted with any conventional cryptography algorithm. In another embodiment of the invention, only the critical data of the CO_TS_packet—the PoEs—are protected with a cryptography algorithm.

FIG. 4 also shows that the continuity_value of the CSTP is set to N, which is identical to an existing value of an ETP packet in the original content A. According to the standard, such duplication is acceptable for all packets containing only adaptation field like CSTP. In other words, the inserting method of the supplementary packet CSTP does not need a reassignment of the continuity_counter for all following packets; the discontinuity of the TS packets does not violate the standard syntax of a TS stream.

2. Forensic Luring

According to a preferred embodiment of the present invention, the process 2: Forensic luring in FIG. 1 is performed in client devices, such as a Set-top-Box. According to another embodiment of the invention, the process 2 is performed in the same device as process 1. Such devices can be a server of the distributor, a head-end machine or even a centre-device at client side.

Input of the process 2 is the fingerprinting-ready content D generated by the process 1. In a preferred embodiment of the invention, the content D is transmitted to the process 2 via conventional distributing network such as DVB-T/S/C, ADSL link, . . . . In another embodiment of the invention, the transmission of the content D is carried out between two processes in a same host machine.

Figure 3:
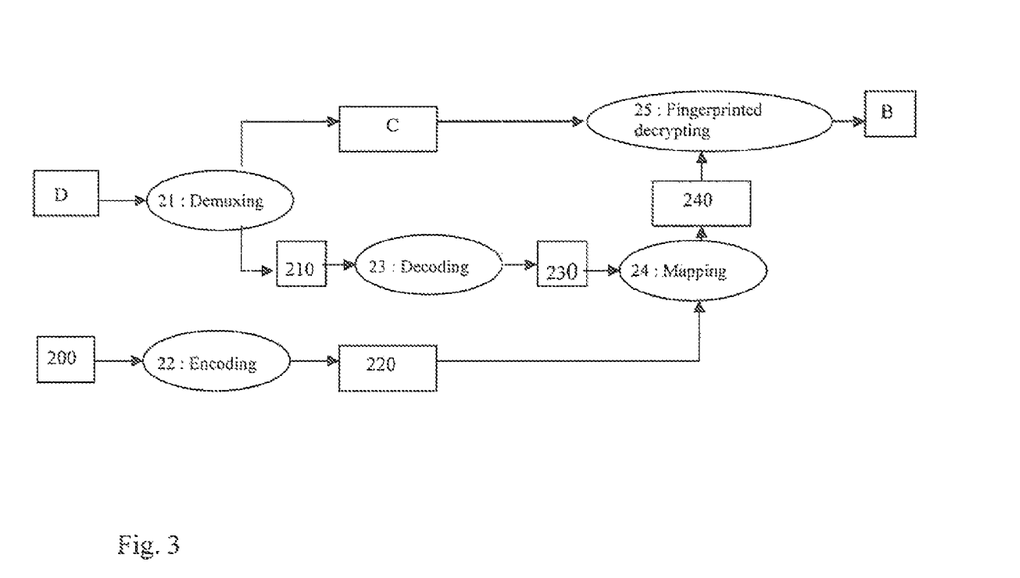
FIG. 3 shows a block diagram of the forensic luring process according to one embodiment of the present invention.

According to a preferred embodiment of the invention, the first unit handling the content D in the process 2 is the demuxer 21 (see FIG. 3). Thanks to a PID value conveyed in a private descriptor in the Program Map Table (PMT) of a multiplexed MPEG-2 TS, the demuxer 21 can first detect the fingerprinting-ready content D having that given PID from any other multiplexed programs. According to a preferred embodiment of the invention, another private descriptor is also added to the PMT to signal that the private data byte in the adaptation field (if available) should be interpreted as in FIG. 4.

According to a preferred embodiment of the invention, the demuxer performs selection of the CSTPs from the ETPs. As a reminder, any TS packet of the given PID can be identified as CSTP if and only if it satisfies all following conditions
- Containing only adaptation field (its conventional field adaptation_field_control takes value 2);
- The adaptation field consists of private data, which in turn can be interpreted successfully in respect to the syntax in FIG. 4.

The detected CSTPs are illustrated as the data 210 in FIG. 3.

According to a preferred embodiment of the invention, the demuxer 21 removes all CSTPs from the content D to reproduce the lured content C. This scenario is denoted in FIG. 3. Yet in another embodiment of the invention, the demuxer 21 just makes a copy of the CSTPs into the data 210 without deleting them from the stream D.

In a preferred embodiment of the invention, the decoder 23 parses the structure CSTP in detail to extract all the CO_TS_packets as well as its properties, including:
- The TS_packet_offset, referring to the associated ETP;
- The PoEs, consisting of the position, size and the replacement values RVs.

This information is together denoted as the data 230 in FIG. 3.

In the necessary case, the decoder 23 performs also the decryption to retrieve the data 230.

FIG. 3 shows another input data of the process 2, called internal parameter 200. A simple example of such internal parameter is the unique address of the security module in a Set-top-Box. The internal parameter 200 is then encoded by the encoder 22.

In a preferred embodiment of the invention, the encoder deploys several encoding schemes in a concatenated manner to generate the so-called fingerprinting identifier 220, which is resistant to some targeted attack. For instance, the internal data 200 can be first encoded with Reed-Solomon encoder having certain block-size. The resulting data is then further encoded with Tardos code. It is obvious to one of ordinary skill in the art that any source coding technique can be deployed in the encoder 22 to reinforce the fingerprinting identifier 220 against some sensible attacks.

According to a preferred embodiment of the invention, one function of the mapping unit 24 is to select a subset of the elements Es in data 230 to be the carrier of the fingerprinting identification ID. This subset is the first set of elements E. This subset of elements Es is hereafter referred to as Marking Subset (MS). According to another embodiment of the invention, the MS consists in all elements Es in the data 230.

According to a preferred embodiment of the invention, another function of the mapping unit 24 is to interpret the identifier into a 2-tuple sequence. Each 2-tuple value contains 2 components: Position Index (PI) and Replacement Value Index (RVI). The former refers to the index of the element E in the marking subset MS, while the latter points to one of the RVs associated to that element E.

According to a preferred embodiment of the invention, the RVI is a binary value. A given element E (in respecting to PI) will be recovered to the first replacement value RVa or the second replacement value RVb in correspondence with the value 0 or 1 of the RVI respectively.

According to one embodiment of the invention, the RVI has a range of N. In this case, each element E must have at least N replacement values RVs, there is enough dimension for a one-to-one mapping from the space of RVI onto the space of AVs.

For the sake of clarity, an example is now demonstrated for mapping operation with the following conditions:
- The marking subset MS has 4 elements Es in a fixed, predefined order;
- The fingerprinting identifier is binary. Its value is supposed to be 0b1010.

One way of mapping this fingerprinting identifier into a 2-tuple sequence of 4 records is (1,1), (2,0), (3,1), (4,0). In each record, the second component is the bit-value of the fingerprinting identifier at the bit-position (from the most significant bit to the less significant bit) indicated by the first component.

The unit 24 then translates this sequence into the position and the value of the element E in the marking subset MS, producing the data 240 (FIG. 3). Remaining within the scope of the above example, the data 240 is also a sequence of 4 records as the following: $(E_1, MV_1)$, $(E_2, OV_2)$, $(E_3, MV_3)$, $(E_4, OV_4)$. It is to be noted that in this example, one of the replacement value RV is the original value OV. The first components in each record refer to one element E of MS in a predefined order (for instance in the ascend order of appearance in the content A). The second components can be either $MV_N$ or $OV_N$ according to the RVI of the associated record is 1 or 0 respectively. The sub-index N of MV/OV refers to the value MV/OV of the $N^{th}$ element E in the marking subset MS.

The data 240 is finally fed to the unit 25 to perform the fingerprinted decryption. An iterative procedure is performed in the unit 25 as the following:
1. Select one 2-tuple record from the data 240 to retrieve its first and second component;
2. With the aid of the first component, the associated element E (together with its PoEs) in the MS is identified;
3. Identify the position of the element E in the input content of the unit 25. According to a preferred embodiment of this invention, the input content is the Lured content C (FIG. 3). In another embodiment of the invention, it is the fingerprinting-ready content D.
4. The value of the element E in the input stream is replaced with the second component of current record of the data 240.

It is worth noting that the above procedure makes the content (either lured or fingerprinting-ready) decoded/meaningful to human and at the same time being marked with the fingerprinting identifier. The inseparability of decoding and marking reinforces the existence of an individual mark in the final content: a malicious user can only distribute an audio-visual content in either a good quality but being marked or bad quality (no business value) without mark.

According to a preferred embodiment of the invention, all other elements Es, i.e. the second set of elements E', which are found in the input stream of unit 25 but not belonging to MS, are replaced with their original values OVs.

According to a preferred embodiment of the invention, the unit 22, 23 and 24 are deployed in a security module at client side. The data 240 is the only one information circulating between the secured and unsecured environment. Apparently, it has the same role as the control word in a conventional Set-top-box. Note that the structure of the 240 is already integrated with the fingerprinting identifier. An abusive distribution of the data 240 in the same manner as the control word sharing can be traced back to the leaking source.

According to one embodiment of the invention, the Marking Value MV can be any AVs, even the LV. In the latter case, the Marking Subset MS can be tuned appropriately to reduce the artifacts number under a still acceptable threshold, which depends on a concrete application.

Figure 5:
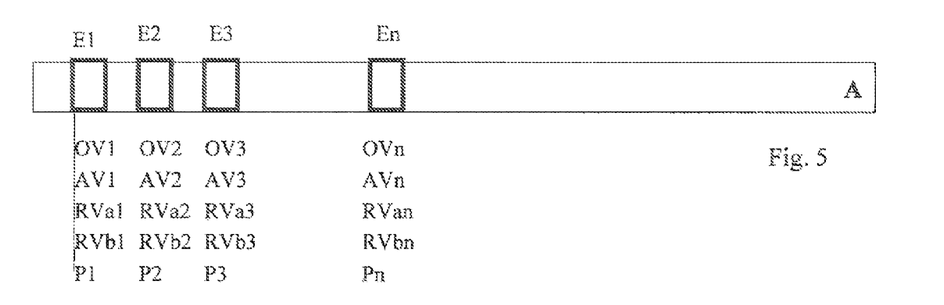
FIG. 5 illustrates the data object A to be transmitted with the elements E.

The FIG. 5 illustrates the original data object A. Several elements E1, E2, E3 . . . En are selected for embedding the luring and fingerprinting processes. For a given element E1, the original value OV1 is replaced by the alternate value AV1. The element E1 is located thanks to the position P1 within the data object A.

In the manner, in all selected elements E1, E2, E3 . . . En the original values OV1, OV2, OV3 . . . OVn are replaced by alternate values AV1, AV2, AV3 . . . AVn. The system in charge of these operations additionally generates replacement values RVa, RVb, at least two replacement values per element E.

Figure 6:
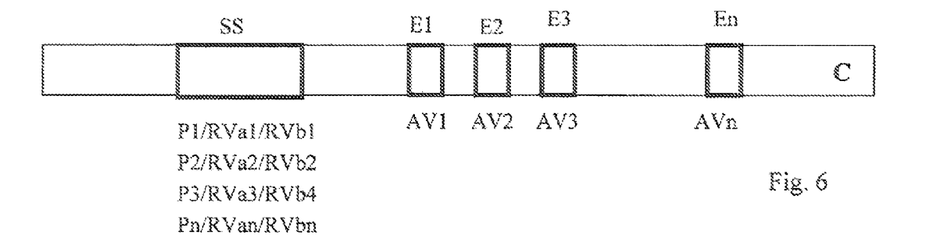
FIG. 6 illustrates the modified data object C comprising the modified elements E as well as the supplementary object Ss.

The FIG. 6 illustrates the data object C in which a supplementary object Ss was inserted. This supplementary object comprises a plurality of supplementary subset Ms, each subset being associated with an element E. The subset Ms comprises at least the position of the element P, the original value OV and replacement values RVa and RVb.

Figure 7:
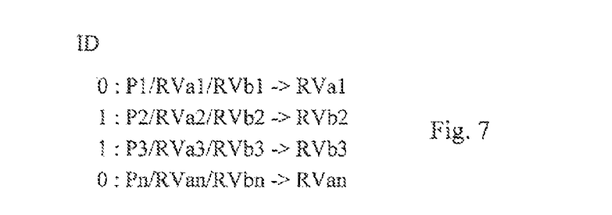
FIG. 7 illustrates the selection step with the identifier ID.

The FIG. 7 illustrates the step of fingerprinting based on the identifier selected among the identifier of the transmission device or the reception device. Once the identifier ID is selected, the bits of the identifier are used as a selector in order to determine which value will finally be in the element E. It is worth noting that the identifier used for the selection step can be the result of a transformation from an internal value of either the transmission device or the reception device. This transformation can be a two-ways function (encryption for example) or a one-way function (Hash function).

Figure 8:
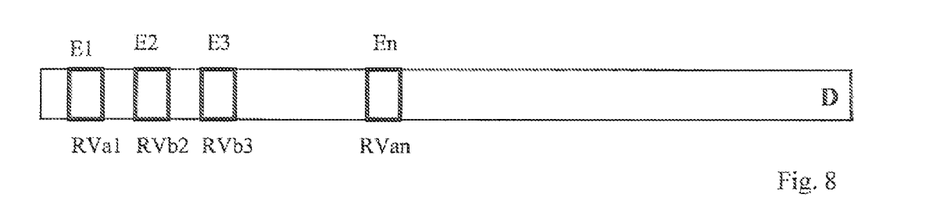
FIG. 8 illustrates the fingerprinted data object B.

The FIG. 8 illustrates the final result according to the selection made by the identifier ID. The element E1 was associated with the first bit of the identifier (bit=0->replace with replacement value RVa, bit=1->replace with replacement value RVb), and so on for the other bits.

In case where the identifier ID comprises more bits than the number of elements associated with one supplementary object, part of the identifier is used in relation with a first supplementary object, and another part is used in relation with another supplementary object.

As already explained, the subset Ms can comprise more than two values and the identifier can be used as a selector to select one value among these values.

One of the replacement values can be the original value OV. In this case, the elements E contain the Original Value OV instead one of the replacement value RV. During the selection step, in case that the identifier has selected the original value OV, the element E will return to its original value. The other elements will contain the replacement values.

The invention claimed is:

1. A method for fingerprinting a data object A having a nominal stream format F, to provide a fingerprinted data object B, comprising a pre-fingerprinting and forensic luring process, wherein
the pre-fingerprinting process comprises:
determining a first set of elements of the original data object (A) each having an original value and a position,
replacing each original value by an alternate value to create a modified data object (C) that remains syntactically correct according to the stream format F, but semantically different according to the perceptive information carried by the original data object (A), regardless which alternate value (AV) was replaced, and
extending the modified data object (C) with at least one supplementary object (Ss) to provide a fingerprinting-ready data object (D) having the same nominal stream format F, comprising, for each element, its position and at least a first replacement value and a second replacement value; and
the forensic luring process comprises:
extracting the supplementary object from the fingerprinting-ready data object (D),
obtaining an identifier to be associated with the fingerprinted data object (B), and
modifying the alternate values at positions in the first set of elements, and for each element, selecting one of the replacement values based on all or part of the identifier to create the fingerprinted data object (B).

2. The method of claim 1, wherein said pre-fingerprinting and forensic luring processes are combined into one process.

3. The method of claim 1, wherein said pre-fingerprinting and forensic luring processes are performed in separate devices and the said fingerprinting-ready data object D are exchanged between them.

4. The method of claim 3, wherein said pre-fingerprinting is executed in a transmission device and the forensic luring is carried out in a reception device, the identifier (ID) being the identifier associated with the transmission device.

5. The method of claim 3, wherein said pre-fingerprinting is executed in a transmission device and the forensic luring is carried out in a reception device, the identifier (ID) being the identifier associated with the reception device.

6. The method of claim 2, wherein said pre-fingerprinting and luring process is executed in a transmission device, said transmission device obtaining the identifier of a reception device for the luring process.

7. The method of claim 1, wherein the alternate value replacing the original value in the modified object C causes a maximal perceptive difference according to the perceptive information carried by the data object.

8. The method of claim 1, wherein the alternate values associated to the value of the identifier produces a minimum perceptive difference while replacing the original value OV in the modified object C.

9. The method of claim 1, further comprising:
determining a second set of elements from said original data object (A) having an second original value and a second position,
replacing each second original value by a second alternate value to create the modified data object (C) that remains syntactically correct according to the stream format F, but semantically different according to the perceptive information carried by the original data object (A), regardless which alternate value (AV) was replaced, adding into the supplementary object (Ss), for each second element, its position and its original value; and the forensic luring process further comprising:

modifying, for each second element, the second alternate value at said second position by the second original value contained in the supplementary object (Ss).

10. The method of claim 1, wherein the first replacement value is the original value.

11. The method of claim 1, wherein the first replacement value is the alternate value.

12. The method of claim 1, wherein the nominal stream format F is an MPEG-2 transport stream format.

13. The method of claim 1, wherein the identifier is calculated from a unique internal parameter of a device where the forensic luring process is performed.

14. The method of claim 1, wherein the calculating operation incorporates an anti-collusion encoding scheme.

15. The method of claim 9, wherein the calculating operation incorporates an anti-collusion encoding scheme.

* * * * *